E. R. BENNETT.
PLOW.
APPLICATION FILED MAR. 7, 1918.
1,278,574.
Patented Sept. 10, 1918.
2 SHEETS—SHEET 1.
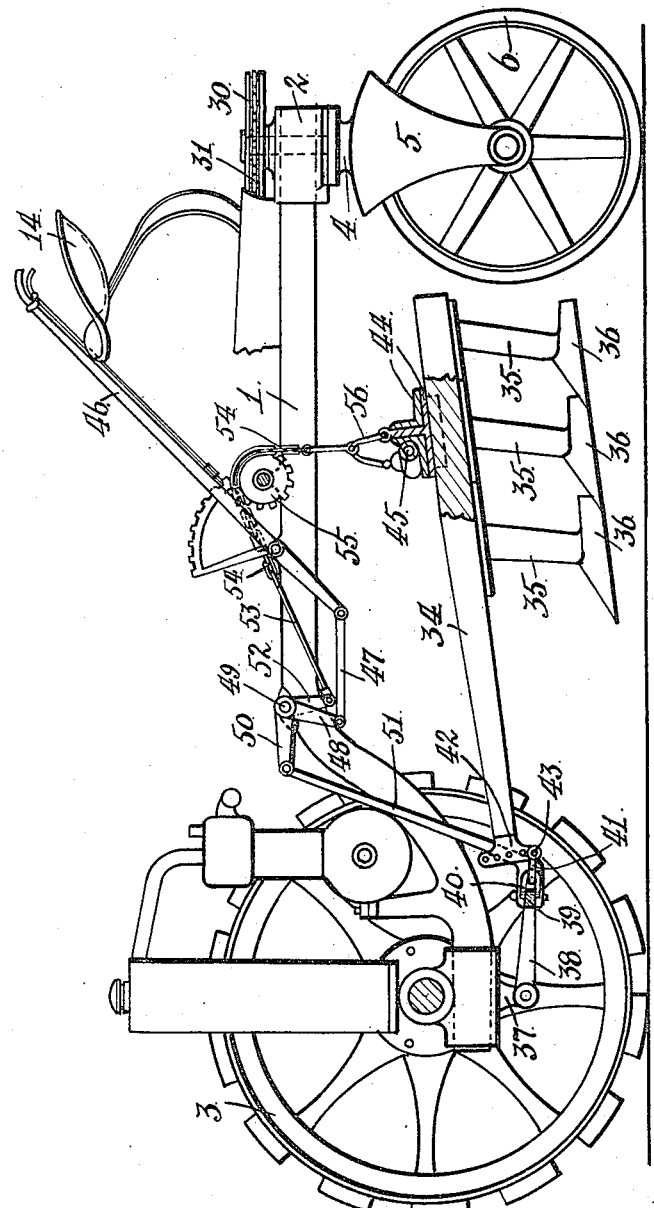
WITNESS:
Wm F. Drew
INVENTOR.
Elbert R. Bennett
BY
Booth & Booth
ATTORNEYS.

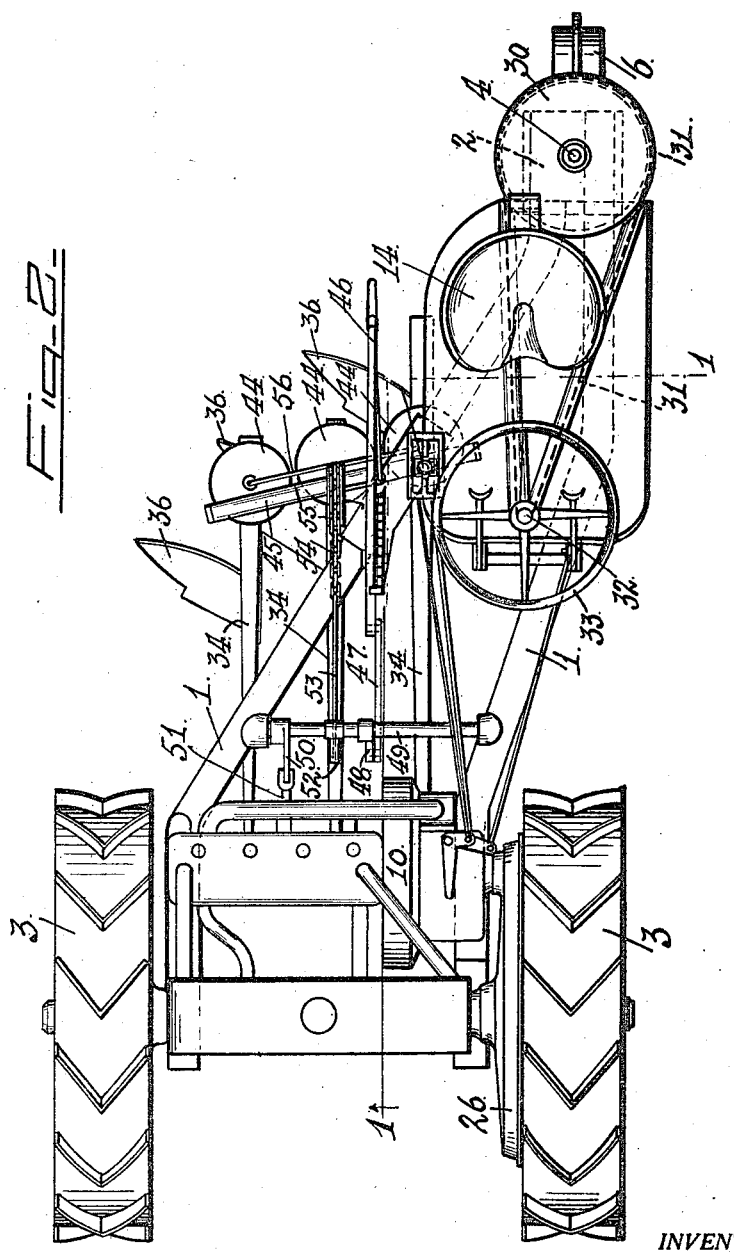

UNITED STATES PATENT OFFICE.

ELBERT R. BENNETT, OF OAKLAND, CALIFORNIA.

PLOW.

1,278,574.  Specification of Letters Patent.  Patented Sept. 10, 1918.

Application filed March 7, 1918. Serial No. 220,900.

*To all whom it may concern:*

Be it known that I, ELBERT R. BENNETT, a citizen of the United States, residing at Oakland, in the county of Alameda and State of California, have invented certain new and useful Improvements in Plows, of which the following is a specification.

My invention relates to the class of plows, cultivators and the like. The object of my invention is to provide a machine of this class in which the cultivating implement is so mounted under the frame as to be capable of adjustment and ready manipulation to accommodate itself to all conditions of surface, as will hereinafter appear.

To this end my invention consists in the novel plow or cultivator which I shall now fully describe by reference to the accompanying drawings, in which—

Figure 1 is a vertical longitudinal section on the line 1—1 of Fig. 2.

Fig. 2 is a top plan view of my plow.

The frame of the machine comprises two side sills 1, which at their forward ends carry the axle assemblage. These sills converge at their rear ends in a coupling 2 in line with one of the main wheels 3. In this coupling is mounted the post 4 and forks 5 of the steering wheel 6, which wheel is thus in line with and tracks that one of the main wheels which travels on the land side of the furrow.

The machine is driven by any suitable power, herein sufficiently indicated as a self-propelling or tractor-mechanism, operated from the driver's seat 14 on the rear of the frame.

30 is the sprocket of the steering wheel and 31 is the steering chain which passes to and is operated by the main steering post 32 of which 33 is the hand wheel.

As heretofore intimated any suitable cultivating implement may be carried by the frame, such, for example, as a harrow or other cultivator or a disk plow, or an ordinary mold-board gang-plow, such as is here shown. This is located directly under the frame. It comprises a plurality of beams 34, carrying at their rear ends the standards 35, which carry the plow-bottoms 36.

Depending from the forward ends of the frame sills 1 are brackets 37 in which is pivoted by its arms 38 a draw-bar 39. To this draw-bar the forward ends of the plow beams 34 are articulated suitably, as, for example, by a clevis connection shown clearly in Fig. 1, and comprising a loop link 40 secured to the draw-bar, a loop-link 41 articulated in the loop-link 40, and a vertical member 42 secured to the plow beam and having a series of holes in any of which a pin 43 is fitted, adapted to be engaged by the link 41. This connection is thus a universal one, enabling the plow beams to individually and jointly adjust themselves under vertical movement or to rock on their axes in turning both separately or as a unit. In this latter movement, the rear ends of the beams, though connected, participate, by reason of a pair of superimposed disks 44, centrally inter-pivoted, one disk of the pair being fixed on the plow beam, and the other being pivotally carried by a cross shaft 45 common to all the beams. These disks act as fifth-wheels in permitting the several adjustments of the beams, under work.

The whole plow is lifted or lowered from and to work, by the following connections.

46 is a lever, the lower end of which is connected by a link 47 with an arm 48 of a rock-shaft 49 mounted between the frame sills 1. The rock-shaft has a second arm 50 to which is connected a link 51 the lower end of which is connected with the swinging draw-bar 39 to which the forward ends of the plow beams are connected.

The rock-shaft 49 has also a third arm 52, as seen in Fig. 2, with a connected link 53, extending to a chain 54, guided over a sprocket 55, the other end of the chain being connected to a bail 56, the extremities of which are connected to the pivot centers of the disk members 44 at the rear ends of the plow beams. By pulling back on the lever 46, the plow implement as a whole is elevated, and by moving the lever forward it is lowered, and when at work, the free connection at the rear does not interfere with any movement which the plow may make in turning or in compensating for inequalities and obstructions.

I claim:—

1. A device of the class described comprising a wheeled frame; plow beams under said frame; brackets depending from the frame; arms pivoted to said brackets; a draw-bar carried by said arms; an adjustable articulated connection between said draw-bar and the forward ends of the plow-beams; a pair of centrally interpivoted superimposed disks carried by the rear ends of each plow-beam, one disk of each pair being fixed on the beam; a cross-shaft to which the other disk of each pair is pivoted; a single operating lever carried by the frame; and connections from said lever to the draw-bar at the front of the plow beams and to the disk connection at the rear thereof.

2. A device of the class described comprising a wheeled frame; plow beams under said frame; brackets depending from the frame; arms pivoted to said brackets; a draw-bar carried by said arms; an adjustable articulated connection between said draw-bar and the forward ends of the plow-beams; a pair of centrally interpivoted superimposed disks carried by the rear end of each plow-beam, one disk of each pair being fixed on the beam; a cross shaft to which the other disk of each pair is pivoted; a single operating lever carried by the frame; and connections from said lever to the draw-bar at the front of the plow beams and to the disk connections at the rear thereof, said connections comprising a rock-shaft connected with said lever, an arm of the rock-shaft and a link therefrom to the draw-bar, a bail connected with the disk connections, and a chain connection from the rock-shaft to the bail.

In testimony whereof I have signed my name to this specification in the presence of two subscribing witnesses.

ELBERT R. BENNETT.

Witnesses:
WM. F. BOOTH,
D. B. RICHARDS.